No. 750,324. PATENTED JAN. 26, 1904.
J. S. TUTTLE.
BALING PRESS.
APPLICATION FILED AUG. 14, 1903.
NO MODEL. 2 SHEETS—SHEET 2.
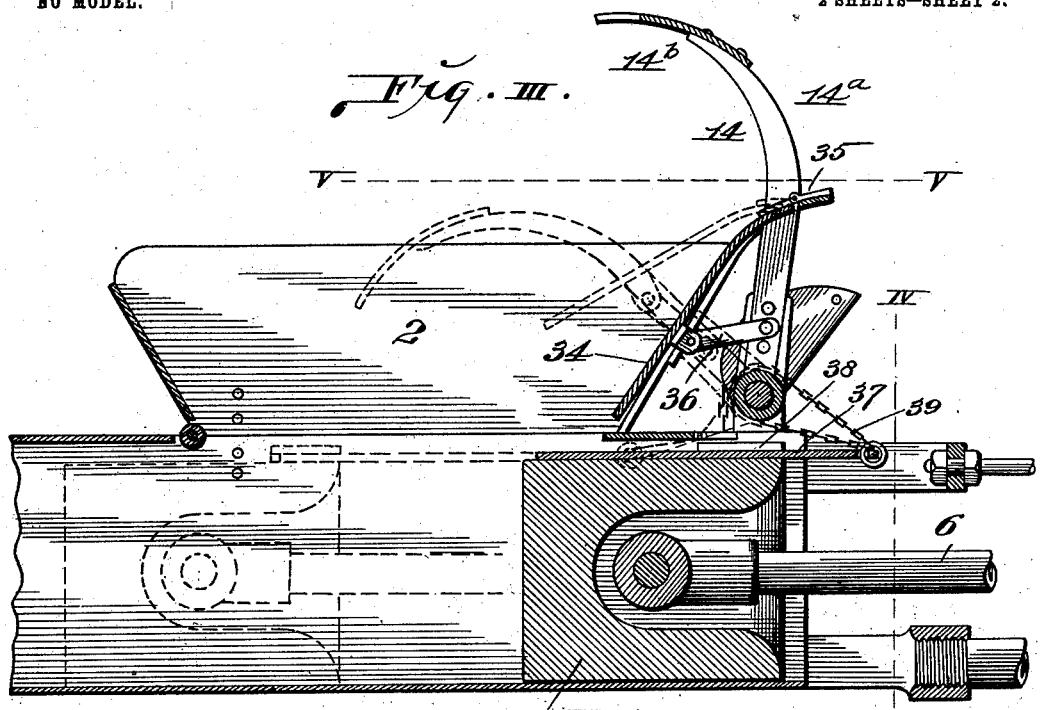
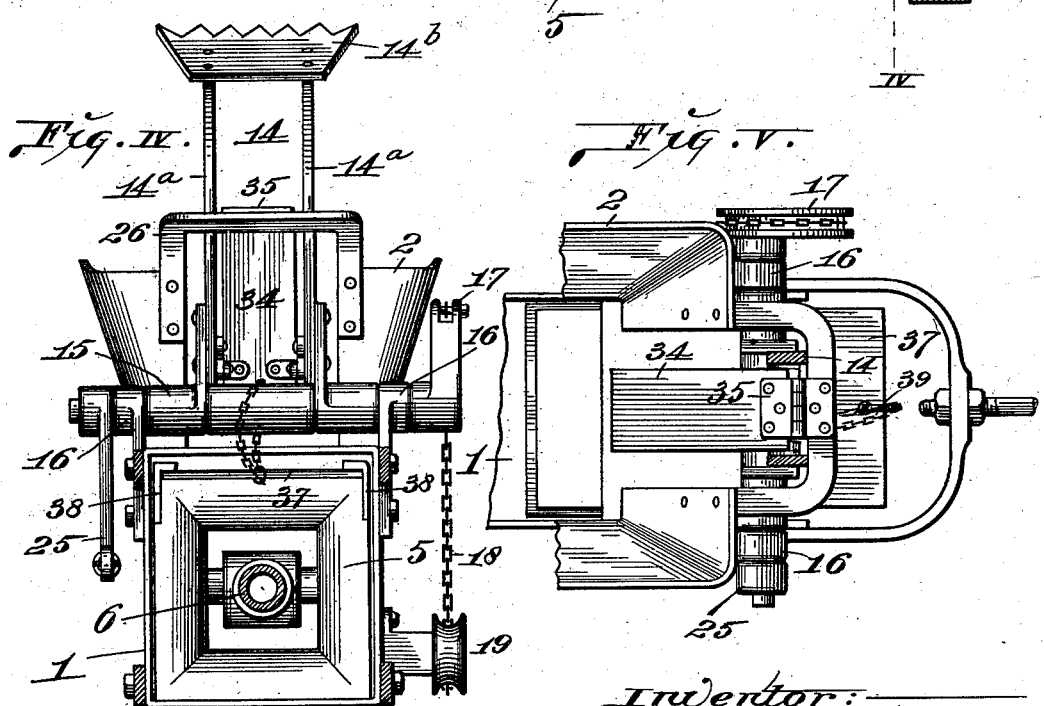
Inventor:
J. S. Tuttle.
By Knight Bro.
atty's
Attest:
M. P. Smith
E. S. Knight No. 750,324. Patented January 26, 1904.

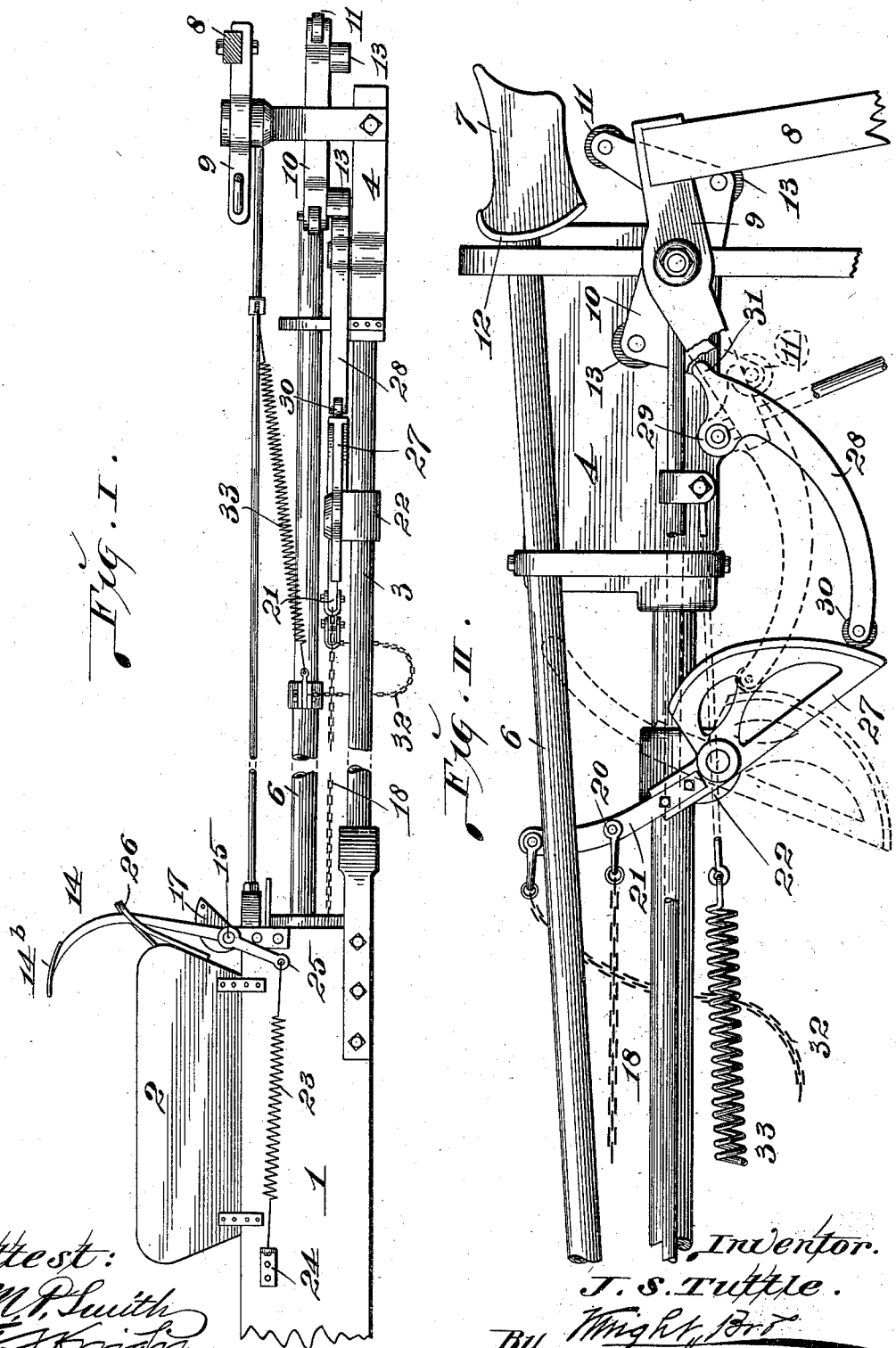

UNITED STATES PATENT OFFICE.

JOSIAH S. TUTTLE, OF KANSAS CITY, MISSOURI, ASSIGNOR TO WHITMAN AGRICULTURAL COMPANY, OF ST. LOUIS, MISSOURI, A CORPORATION.

BALING-PRESS.

SPECIFICATION forming part of Letters Patent No. 750,324, dated January 26, 1904.

Application filed August 14, 1903. Serial No. 169,426. (No model.)

*To all whom it may concern:*

Be it known that I, JOSIAH S. TUTTLE, a citizen of the United States, residing in Kansas City, in the county of Jackson and State of Missouri, have invented certain new and useful Improvements in Baling-Presses, of which the following is a full, clear, and exact description, reference being had to the accompanying drawings, forming part of this specification.

My invention relates, first, to the manner of operating the feeder from the power end of the press and for starting the backward movement of the plunger should it tend to stick; secondly, to means for throwing the hay or other material forward as the feeder descends, so that it will not catch or bind against the rear wall of the feed-opening of the baling-chamber; and, thirdly, to a form of sliding cap carried by the plunger and which serves to keep the stuff from falling down behind the plunger when the latter is in its forward position.

Figure I is a side view of the power end of a baling-press embodying my invention. Fig. II is a detail top view. Fig. III is an enlarged detail vertical section of the middle or hopper part of the press. Fig. IV is a vertical section taken on line IV IV, Fig. III. Fig. V is a detail top view taken on line V V, Fig. III.

Referring to the drawings, 1 represents the baling-chamber or body of the press; 2, the feed-hopper of the press; 3, the reach; 4, the reach-head; 5, the plunger; 6, the pitman; 7, the pitman-head; 8, the sweep; 9, the sweep-head, and 10 the cross-head, having a pair of friction-rollers 11 for engagement with a flange 12 on the pitman-head and a pair of friction-rollers 13 for engagement with the end of the pitman-head. These parts *per se* are all old and form no part of my invention.

14 represents the feeder of the press, and my invention in part relates to the manner of operating the feeder. The feeder is secured to a rock-shaft 15, journaled in brackets 16, secured to the side walls of the baling-chamber. The feeder is composed of arms $14^a$ and a head $14^b$. To one end of the rock-shaft 15 is secured a crank 17, to the outer end of which is connected one end of a chain 18, that passes beneath a pulley 19, secured to the baling-chamber of the press, and the other end of which is connected at 20 to a lever 21, pivoted to a clip 22, made fast to the reach 3 of the press. When the lever is moved to the position shown in dotted lines, Fig. II, the feeder is moved downwardly to force the charge into the baling-chamber, and when the lever is released the parts are restored to their normal positions by a spring 23, connected at one end to a bracket 24, made fast to the body of the press, and at the other end to a crank 25 on the rock-shaft 15. The back of the hopper 2 is provided with a strap 26 to form a stop and rest for the feeder when in its upper position.

The lever 21 is provided with a cam-head 27, located in the path of the long end of an arm 28, that is pivoted at 29 to the reach-head 4, the outer end of the arm having a friction-roller 30, that engages the head 27 and forces the lever from the position shown in full lines, Fig. II, to the position shown in dotted lines, thus lowering the feeder. The arm 28 is moved by its short end 31 being engaged by the rollers 13 on the power-head 10. With this arrangement a powerful and quick movement is imparted to the feeder, which is allowed to rebound freely and quickly under the influence of the spring 23 as soon as the arm 28 leaves the head 27 of the lever 21. To avoid danger of the plunger sticking when in its forward position, I connect it, by means of a chain 32, to the outer end of the lever 21, so that if the plunger sticks in its forward position the first part of the movement of the lever 21 will start the backward movement of the plunger, and then the spring 33 will draw the plunger quickly to its outer position.

When a charge of hay or other material is being forced by a feeder into the baling-chamber, it is liable to bind against the upper rear corner of the feed-opening of the press, and to prevent this, as well as to in a measure condense the material, I hinge a plate 34, that constitutes the back of the hopper, to the strap 26, as shown at 35, and I connect the lower end of this plate to the feeder by means of links 36, so that when the feeder moves downwardly the plate 34 will swing forward, as shown by dotted lines, Fig. III.

For the purpose of keeping any material from falling into the baling-chamber behind the plunger when the latter is in its forward position I employ a sliding plate 37, that is held to the top of the plunger by means of brackets or keepers 38. There is sufficient friction between the plate and the plunger to cause them to move forward together until the movement of the former is arrested by a chain 39, that is looped over the shaft 15 and connected to the outer end of the plate. This stopping of the plate causes it to cover the space behind the plunger when the latter is in its forward position, as shown by dotted lines, Fig. III. When the plunger returns, the plate will be carried back with it until its movement is arrested again by the chain 39, and the continued movement of the plunger will bring it centrally beneath the plate.

I claim as my invention—

1. In a baling-press, the combination of a feeder, a power-head, and means interposed between the feeder and power-head to cause the former to be moved by the latter; said means consisting of a pivoted lever provided with a cam-head on one end, a chain connecting the other end of the lever to the feeder, and a pivoted arm having a long end adapted to engage said cam-head and a short end adapted to be engaged by said power-head, substantially as set forth.

2. In a baling-press, the combination of a plunger, a power-head, and means for starting the backward movement of the plunger in case it should tend to stick; said means consisting of a pivoted lever having a cam-head, a chain connecting the other end of the lever to the plunger, and a pivoted arm one end of which is adapted to engage said cam-head and the other end of which is adapted to be engaged by said power-head, substantially as set forth.

3. In a baling-press, the combination of a feeder, means for operating the feeder, and a hinged plate forming the back of the hopper and which is connected to said feeder so as to be thrown forward when the feeder moves downwardly, substantially as set forth.

4. In a baling-press, the combination of a feeder, means for moving the feeder, a strap for arresting the backward movement of the feeder, a plate hinged to said strap, and links connecting said plate to said feeder, substantially as and for the purpose set forth.

5. In a baling-press, the combination of a plunger, a movable plate supported by the plunger, and a chain connecting said plate to a fixed point; whereby the plate is carried forward with the plunger for a distance and then its movement is arrested by said chain, substantially as and for the purpose set forth.

JOSIAH S. TUTTLE.

In presence of—
GILBERT J. CLARK,
T. A. ALEXANDER.